(12) United States Patent
Bangui

(10) Patent No.: US 7,739,514 B2
(45) Date of Patent: Jun. 15, 2010

(54) SOFTWARE APPLICATION INTEGRITY VERIFICATION METHOD AND DEVICE

(75) Inventor: Francois Bangui, Paris (FR)

(73) Assignee: Enigma Systems, Paris (FR)

( * ) Notice: Subject to any disclaimer, the term of this patent is extended or adjusted under 35 U.S.C. 154(b) by 1021 days.

(21) Appl. No.: 10/539,566

(22) PCT Filed: Dec. 23, 2003

(86) PCT No.: PCT/FR03/03877

§ 371 (c)(1),
(2), (4) Date: Jun. 7, 2005

(87) PCT Pub. No.: WO2004/059450

PCT Pub. Date: Jul. 15, 2004

(65) Prior Publication Data

US 2006/0085645 A1    Apr. 20, 2006

(51) Int. Cl.
G06F 11/30    (2006.01)
H04L 9/32     (2006.01)
(52) U.S. Cl. ........................ 713/187; 713/1; 713/176; 713/181; 713/194
(58) Field of Classification Search .................. None
See application file for complete search history.

(56) References Cited

U.S. PATENT DOCUMENTS 6,006,328 A    12/1999  Drake 6,308,270 B1    10/2001  Guthery
2003/0196102 A1*  10/2003  McCarroll .................. 713/194
2004/0025022 A1*  2/2004  Yach et al. .................. 713/176

FOREIGN PATENT DOCUMENTS

WO    WO 99/35582    7/1999
WO    WO 00/33196    6/2000

OTHER PUBLICATIONS

Hoi Chang and Mikhail J. Attallah: "Protecting Software Code by Guards" Lecture Notes in Computer Science, Springer Verlag, vol. 2320, Jun. 10, 2002, pp. 160-175, XP002245264 ISBN: 3540436774 p. 162—p. 163 p. 168.

* cited by examiner

Primary Examiner—Kaveh Abrishamkar
(74) Attorney, Agent, or Firm—Young & Thompson

(57) ABSTRACT

A method of verifying the integrity of a software application that can be executed on a host terminal includes (i) determining at least one series of control instructions forming an executable certificate for the software application, which can be executed by the host terminal during execution of the software application to be verified; (ii) on the host terminal, executing the software application to be verified, receiving the executable certificate determined during step (i) and executing the series of control instructions for the certificate which can be executed in the memory context of the host terminal; (iii) comparing the result thus obtained through execution of the control instructions with the result expected from an authentic software application; and (iv) in the event of a positive comparison, continuing with the execution of the software application to be verified.

24 Claims, 2 Drawing Sheets

SOFTWARE APPLICATION INTEGRITY VERIFICATION METHOD AND DEVICE

CROSS-REFERENCE TO RELATED APPLICATIONS

The present application claims priority to and incorporates by reference PCT/FR03/03877 filed Dec. 23, 2003 and French Patent Application 02 16652 filed Dec. 24, 2002.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The present invention relates to the verification of the authenticity of a software application executed on a host terminal without necessarily resorting to encoding/decoding keys.

2. Description of Related Art

It finds a general application in the authentication of software applications and, more particularly, software applications intended to be executed on a data processing apparatus, more especially a host terminal such as a digital television decoder, equipment for visualising multimedia contents, a micro-computer, a smart card, a personal organiser, a games console, a mobile telephone or the like.

Means of authentication are already known which permit the authenticity or the integrity of software applications loaded and executed on host terminals to be verified. Generally such authentication means use cutting functions and/or cryptographic algorithms which use secret data such as private or secret encoding/decoding keys hidden in the verification software of the host terminal. Most often, these secret data are protected by obfuscation techniques intended to make retroconception more difficult.

In practice, such authentication means loaded in the host terminals are just as vulnerable as the software applications, the authenticity of which they are intended to control. In fact, an experienced pirate can carry out malicious modifications to these authentication means in order, for example, to recover the secret data, delude the verification system or make it produce, in spite of itself, the expected results.

BRIEF SUMMARY OF THE INVENTION

The present invention overcomes this disadvantage. It relates to a method of verifying the integrity of a software application which is executable in a host terminal.

According to a general definition of the invention, the method comprises the following steps:

i) determining at least one series of control instructions forming an executable certificate for said software application;

ii) on the host terminal, executing the software application to be verified, receiving the executable certificate thus determined during step i), and executing the series of control instructions for said executable certificate in the memory context of said host terminal;

iii) comparing the result thus obtained through the execution of the control instructions with the result expected from an authentic application; and iv) in the event of a positive comparison, continuing the execution of the software application to be verified.

Understood here by the term "positive comparison" is the fact that any action, operation or modification on the data used by the software application to be verified or any action, operation or modification on the running of the execution of the software application to be verified produces a behaviour of the software application to be verified identical to that which is expected by the running of the execution of the authentic application.

By renewing, at a selected rate, the series of control instructions for the executable certificate, it is possible to carry out a large number of authentication means for an application, and it becomes virtually impossible to operate pirate software applications which systematically foil the process of verification.

Thus, the method according to the invention permits the integrity of a software application executed on a host terminal to be verified with a relatively satisfactory degree of security in respect of pirates adept at retroconception, and this without resorting to encoding/decoding keys or to expensive hardware components.

According to one embodiment, the series of control instructions is selected so that the state of the memory context of an authentic software application after the execution of the series of control instructions is identical (without modification) to the state of the memory context of the software application prior to the execution of the series of control instructions. Thus, the operation of the method according to the invention does not cause any dysfunctioning at the level of the running of the software application to be verified if the latter is authentic.

According to one embodiment, in which the host terminal is provided with a processor, the series of control instructions forming the executable certificate is encoded in a language which can be interpreted by said processor of the host terminal.

As a variant, in which the host terminal is provided with a virtual machine which is capable of emulating a processor, the series of control instructions forming the executable certificate is encoded in a language which can be interpreted by the virtual machine of the host terminal.

In practice, the memory context for executing a software application is made up, inter alia, of the addresses in the memory of the symbols (functions, variables, . . . ), of the executable instructions, of the data, and of the state of the execution stack of the application. These values are unique for each computer application in the course of execution and for each type of processor or virtual machine.

In step i), provision is made to establish, in a secure environment, a map with the memory context of the authentic software application during the course of execution, to determine, by using the values of this memory map, a series of control instructions which form an executable certificate.

In step ii), the routing device of the executable certificate for the host terminal is housed in an electronic processing circuit which is physically separated from the host terminal. Always in step ii), the recovery of the execution values of the memory context is effected by reading the values at the addresses of the various portions of memory of the host terminal. In these portions are housed the executable instructions intrinsic to the application, the values of the variables and the values of the references to the functions of the application to be controlled.

In step iii), the result obtained by the execution of said series of control instructions is a signature for the application to be verified. This signature is calculated by said series of control instructions which uses the values of the memory context of the software application to be verified during the course of execution. Preferably, the software application comprises instructions which permit said series of instructions to be inserted and executed in its memory context by substituting at least one address for executing an instruction of said software application by at least the address of one instruction of the series of control instructions which form the executable certificate.

According to another embodiment, the series of control instructions forming the executable certificate is transported into a stream of data necessary for the execution of the software application to be verified. To force the execution of the series of instructions for said executable certificate, said useful data are previously protected by an encoding method. The decoding of these data is correctly effected by said series of control instructions for the executable certificate if the application to be verified is an authentic application. If the method of encoding uses a key, the latter is produced by the control instructions with values of the memory context of the software application to be verified, values which form the signature of the software application to be verified. The operations to obtain the encoding key are encoded in the series of instructions for the executable certificate.

As a variant, the protection method is without a key, the series of operations to produce the accessibility of the data is in the series of control instructions for the executable certificate. In practice, the protection of the necessary data for the operation of the software application to be verified is undertaken in a secure environment before these data are transmitted. The method of protection, with or without a key, must be reversible.

According to yet another embodiment, in which the execution of the software application resorts to a smart card or any other secure circuit to operate, the series of control instructions is housed in the smart card (or the secure circuit) and sent to the software application to be verified, the software application being capable of recovering and executing said series of control instructions thus sent with the data which it needs to operate. In practice, access to data transmitted by the smart card (or the secure circuit) must be necessary to the software application to be verified for this to behave in an identical manner to an authentic application.

According to another embodiment, following a negative verification of the integrity of the software application to be verified, the executable certificate executes instructions which resort to functions belonging to another application.

The present invention also relates to an apparatus for verifying the integrity of a software application for accomplishing the method according to the invention.

According to an important characteristic of the invention, the verification apparatus comprises processing means capable of determining at least one series of control instructions forming the executable certificate for the software application, which can be executed by said host terminal during the execution of the software application to be verified, and comparison means for comparing the result of the execution of the executable certificate on the behaviour of the software application to be verified with the result expected from the behaviour of an authentic application, and means of modifying the execution of the software application to be verified as a function of the result of the comparison.

According to one embodiment, the verification apparatus comprises a smart card or any other secure circuit which is capable of containing, on the one hand, the series of control instructions forming the executable certificate and, on the other hand, an application effecting the verification test. The host terminal is provided with a smart card reader (or with a means for communicating with the secure circuit), and the means for executing the software application to be verified are designed to load and execute in its memory context the series of instructions forming the certificate. The verification application in the smart card or the secure circuit is designed so as to modify the normal running of the execution of the software application to be verified if the result of the execution of the series of control instructions is not transmitted, in conditions previously defined, to the verification application in the smart card or the secure circuit, or if the result of the verification proves to be negative.

According to a variant, the apparatus is capable of determining a plurality of executable certificates which differ from one another according to a selected rate and/or condition. In practice, the host terminal belongs to the group formed by data processing apparatuses, digital television decoders, equipment for visualising multimedia contents, micro-computers, smart cards, personal organisers, game consoles, mobile telephones or the like.

BRIEF DESCRIPTION OF THE SEVERAL VIEWS OF THE DRAWING

Other characteristics and advantages of the invention will appear in the light of the detailed description hereinafter and the drawings, in which.

DETAILED DESCRIPTION OF THE INVENTION

In practice, the terms "genuine" and "authentic" are used irrespectively here for a software application.

Understood here by "executable certificate" is a series of control instructions executable in the memory context of a software application in the course of execution, and the execution of which produces effects such as the execution of a software application to be verified has a behaviour identical to that which is expected if the latter is genuine.

Figure 1:
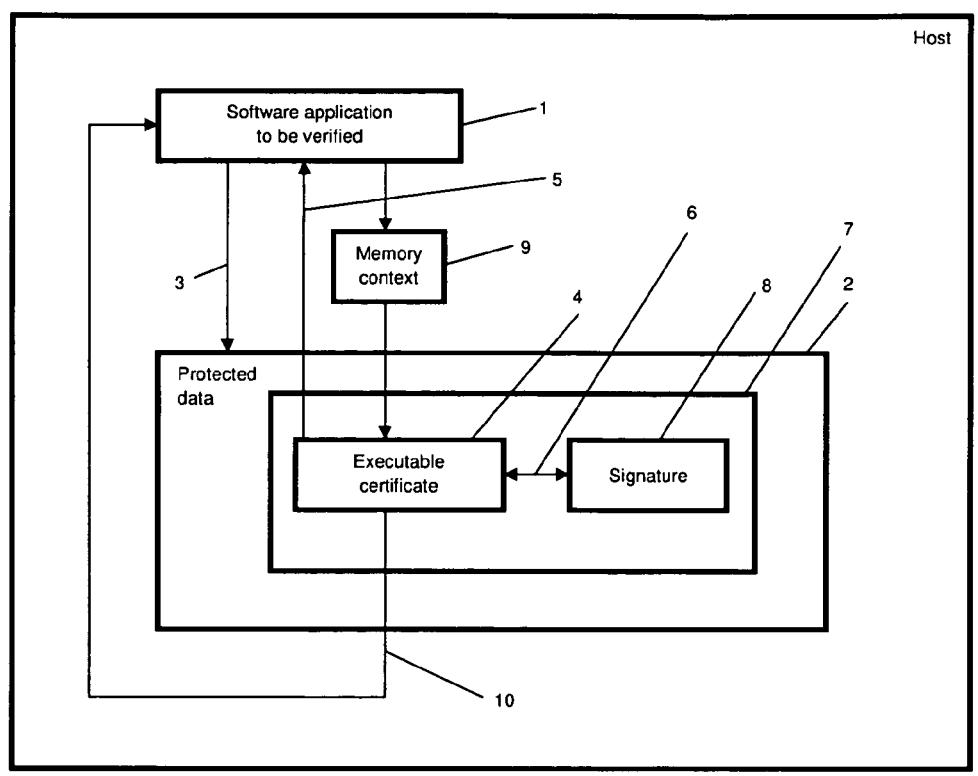
FIG. 1 is a schematic view illustrating the verification of a software application, the useful data of which contain the executable certificate, according to the invention.

With reference to FIG. 1, the software application to be verified 1 is loaded into a host terminal. For example, the host terminal belongs to the group formed by data processing apparatuses, digital television decoders, equipment for visualising multimedia contents, micro-computers, smart cards, personal organisers, game consoles, mobile telephones or the like.

In practice, the software application to be verified 1 processes 3 previously protected data 2, that is to say not processable by the application to be verified when control instructions of the executable certificate, which will be described in more detail hereinafter, have not authenticated the application to be verified. One method of making these data non-accessible consists of encoding them. Any other method of reversible protection is conceivable.

These protected data 2 contain 7 an executable certificate 4 including a series of non-protected control instructions, which are executed 5 by the application to be verified 1. In practice, the control instructions for the executable certificate 4 are coded in the language of the processor of the host terminal, still called machine language. As a variant, the instructions for the executable certificate 4 may also be coded in the language of a virtual machine, emulating the behaviour of a processor.

These control instructions for the executable certificate 4 in machine language are binary structures previously determined prior to their being transmitted to the software application to be verified.

The control instructions for the executable certificate 4 are selected so that only an authentic software application can execute them to produce a result identical to that which is expected. As will be seen in more detail hereinafter, the absence of dysfunctioning of the authentic software application is obtained by selecting a series of control instructions in such a manner that the state of the memory context of one software application to be verified 1 after the execution of the series of control instructions is identical to the state of the memory context of the software application prior to the execution of the series of control instructions.

The executable certificate 4 may also be inserted in the stream of data which the application 1 is capable of processing. The insertion of executable certificates in a stream of data may correspond to the case where it is necessary to authenticate a protected multimedia stream processing application, accessible to the user on condition that the latter has fulfilled obligations such as defined by the seller of the contents. The source of the multimedia stream may be a transmission point of a broadcasting network, the permanent memory of the host terminal, or even a memory unit extractable from the host terminal.

The control instructions for the executable certificate 4 are selected to calculate 6 a signature 8 of the application to be controlled 1, by using 9 the memory context of the application to be controlled 1, in the course of execution. The use of the memory context by the control instructions is achieved by picking-up the values of certain symbols (variables, functions, executable instructions) of the application to be verified in the course of execution. The recovery of these values depends, inter alia, on the memory model implemented in the processor of the host terminal.

In practice, the series of control instructions for the executable certificate 4 produces 6 a signature 8 which depends 9 on the memory context of the software application to be verified 1, and uses this signature to lift the protection 10 of the protected data 2. If the software application is authentic, the data 2 are rendered accessible and their processing 3 by the software application to be verified 1 will produce a result identical to that of an authentic application.

In the event that the executable certificate 4 containing the control instructions is inserted in a stream of data, it is necessary to force the application to execute these instructions. The control instructions are then programmed to decode a portion of the stream of data which the application to be verified has to process. This necessitates a prior processing of the stream of data by encoding before this stream is accessed, for processing, by the application to be verified. The decoding algorithm may be implemented in the control instructions or be available in the form of a function implemented in the terminal, and called-up by the control instructions. The keys, if used by the decoding algorithm, are calculated by the control instructions by using previously defined values of the memory context of the application in the course of execution.

Figure 2:
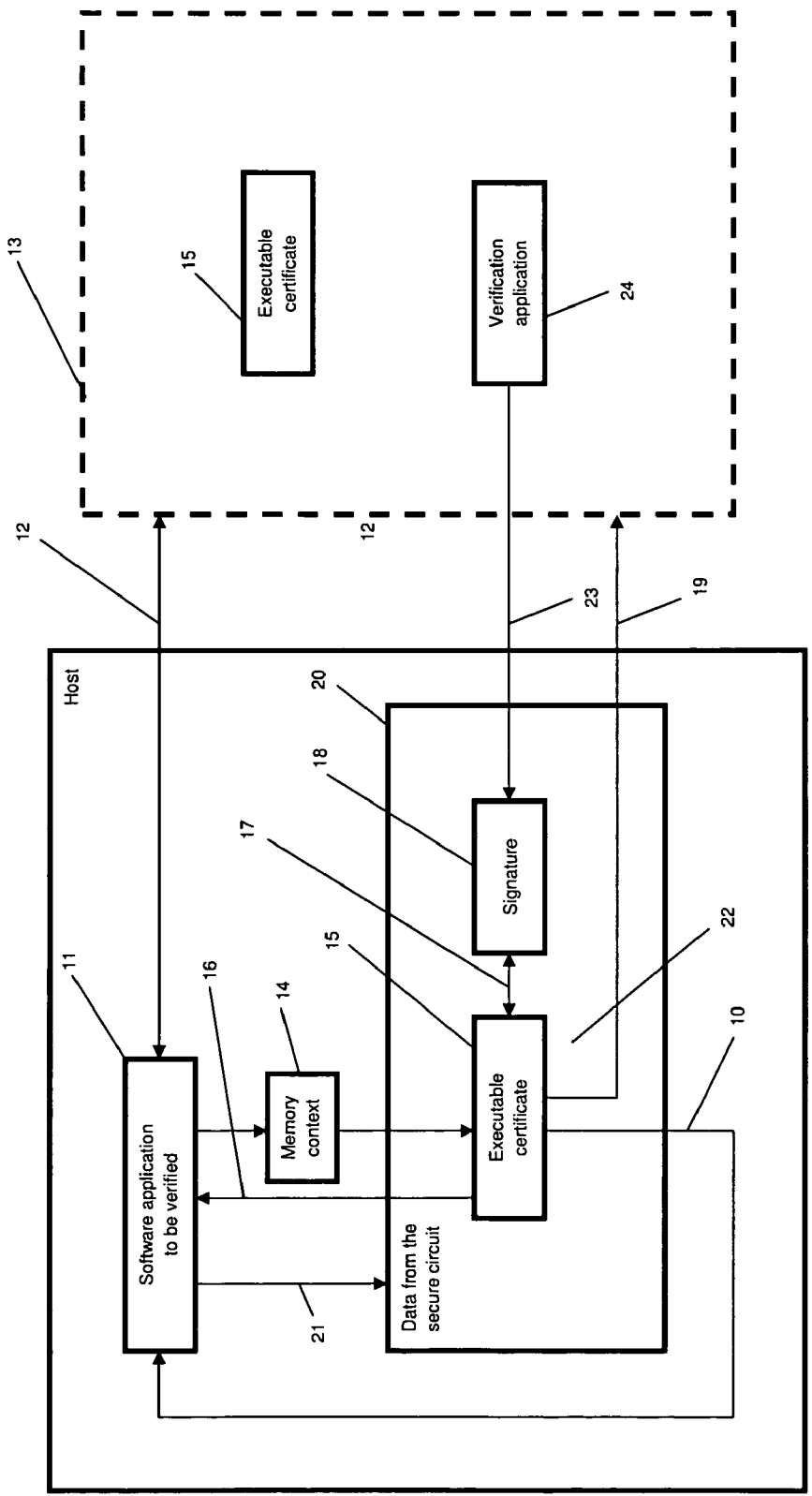
FIG. 2 is a schematic view illustrating the verification of a software application using a smart card according to the invention.

With reference to FIG. 2, the software application to be verified 11 interacts 12 with a secure circuit 13, of the smart card or similar type.

The smart card 13 transmits 19 an executable certificate 15 containing control instructions which are loaded and executed 16 by the software application to be verified 11. Thus, for an application 11 necessitating 12 a smart card 13 to operate, the control instructions 15 are stored in the smart card 13 and sent to the application to be controlled 11 by means of the interactive link 12.

To operate, the application to be controlled 11 uses 21 data 20 which it recovers by interaction 12 with the smart card 13. These data 20 contain 22 the executable certificate 15. The control instructions for the executable certificate 15, when they are stored on the smart card 13, are loaded by the application to be controlled 11 in such a manner that the latter executes them 16 according to the principle explained with reference to FIG. 1.

A signature 18 of the software application to be verified is produced 17 by the control instructions for the executable certificate by using 14 the memory context of the software application to be controlled.

The control instructions for the executable certificate interact 19 with the secure circuit 13 in such a manner that the signature 18 of the controlled application 11 is transmitted to another verification application 24 housed on the smart card 13, considered here as a secure environment. The verification application 24 in the smart card maintains, for each type of processor and for each application to be controlled, a table of correspondence between the executable control instructions 15 and the expected results.

This correspondence table permits the validity of the signature calculated by the executable certificate 15 to be verified 23. If the result of the verification is negative, the verification application housed in the smart card interacts 12 with the application to be controlled in order to modify the operation of the latter. If the verification is positive, the smart card 13 produces the data 20 which the software application 11 needs in order to operate 21.

In one embodiment, the certificates housed in the smart card or the secure circuit change according to a selected rate or condition.

The invention claimed is:

1. A method of verifying the integrity of a software application which is executable in a host terminal, comprising the steps of:
   i) using the memory context of the authentic software application during the course of execution for determining at least one series of control instructions forming an executable certificate for the software application, which can be executed by said host terminal during the execution of the software application to be verified;
   ii) on the host terminal, executing the software application to be verified, receiving the executable certificate thus determined during step i), and executing the series of control instructions of said executable certificate using the memory context of the software application to be verified;
   iii) positively comparing the result thus obtained through the execution of the control instructions in the memory context of said host terminal with the result expected from an authentic software application; and
   iv) in the event of a positive comparison, continuing with the execution of the software application to be verified (1, 11).

2. The method according to claim 1, in which the host terminal is provided with a processor, wherein said series of control instructions forming the certificate being coded in a language which can be interpreted by said processor of the host terminal.

3. The method according to claim 1, in which the host terminal is provided with a virtual machine which is capable of emulating a processor, wherein said series of control instructions forming the certificate being coded in a language which can be interpreted by the virtual machine of the host terminal.

4. The method according to claim 1, in which the executable certificate includes a portion of the processing necessary for the satisfactory operation of the authentic application.

5. The method according to claim 1, wherein step i) comprising the steps of, establishing in a secure environment, a map with the memory context of the authentic software application during the course of execution, and determining, from the values of this memory map, the series of control instructions intended to form the executable certificate.

6. The method according to claim 1, wherein, in step ii), the executable certificate for the host terminal emanates from an electronic processing circuit which is physically separated from the host terminal.

7. The method according to claim 1, wherein, in step ii), the recovery of the execution values of the memory context comprising the step of reading the values at the addresses of the various portions of the memory of the host terminal, these portions containing the executable instructions and the data intrinsic to the application to be verified.

8. The method according to claim 1, wherein in step iii), the result obtained by the execution of said series of control instructions produces a signature for the application to be verified, said step iii) comprising the step of calculating this signature by said series of control instructions which uses the values of the memory context of the software application to be verified during the course of execution of the application.

9. The method according to claim 1, wherein the software application comprises instructions which permit said series of control instructions to be loaded and executed in the memory context map by substituting at least one address for executing an instruction of said software application by at least one instruction address of the series of instructions which form the certificate.

10. The method according to claim 1, wherein the series of control instructions is selected in such a manner that the state of the memory context of the software application after the execution of the series of control instructions is identical to the state of the memory context of the software application prior to the execution of the series of control instructions.

11. The method according to claim 1, wherein the series of instructions forming the certificate is transported into a stream of data necessary for the execution of the software application to be verified.

12. The method according to claim 1, wherein the software application to be verified is wholly or partially encoded, the correct deciphering of the software application being achieved in the event of integrity of the software application to be verified.

13. The method according to claim 1, further comprising: after step i), a step consisting of inserting the executable certificate into a first stream of data and of processing, through encoding, a second stream of the data necessary for the satisfactory operation of the software application to be verified, prior to said second stream being obtained for processing through the software application to be verified.

14. The method according to claim 1, wherein the series of control instructions is selected in such a manner that the state of the memory context of the software application after the execution of the series of control instructions is without any modification to the state of the memory context of the software application prior to the execution of the series of control instructions.

15. An apparatus for verifying the integrity of a software application which is intended to be executed in a host terminal for accomplishing the method according to claim 1, comprising:

processing means capable of determining at least one series of control instructions for the software application, which can be executed by said host terminal during the execution of the software application, and which forms an executable certificate of said software application, means for moving said executable certificate to the host terminal and executing means for executing the series of instructions forming the certificate on said host terminal during the execution of said software application, comparison means for positively comparing the result obtained through the execution of the control instructions with the result expected from an authentic application, and means which are capable, in the event of a positive comparison, of continuing with the execution of the software application to be verified.

16. The apparatus according to claim 15, further comprising a smart card or any other secure circuit which is capable of containing the series of control instructions forming the certificate, the host terminal being provided with a reader for reading a smart card or with a means for communicating with the secure circuit, and the means for executing the software application being provided in order to pick-up, in the smart card or in the secure circuit, the series of instructions forming the certificate during the execution of the software application to be verified.

17. The apparatus according to claim 15, wherein the host terminal comprising means of returning, to the smart card or to the secure circuit, a signature produced by the series of control instructions, and the smart card or the secure circuit additionally comprises a software application verifying means which is capable of validating or invalidating the authenticity of the software application to be verified in dependence on the result of the comparison between a signature produced by the series of control instructions and a value for the signature which is known and previously stored in the smart card or in the secure circuit.

18. The apparatus according to claim 17, wherein the smart card comprises means for modifying the operation of the software application to be verified in the event of a negative comparison.

19. The apparatus according to claim 17, wherein the smart card comprises means for modifying the operation of the software application to be verified in the event of a non-transmission of the signature in conformity with predetermined conditions.

20. The apparatus according to claim 15, further comprising means which are capable of preventing the operation of the software application in the host terminal in the event of a negative comparison.

21. The apparatus according to claim 15, wherein the host terminal belongs to the group formed by data processing apparatuses, digital television decoders, equipment for visualising multimedia contents, micro-computers, smart cards, personal organisers, game consoles, and mobile telephones.

22. The apparatus according to claim 15, wherein the processing means comprising means for determining a plurality of executable certificates which differ from one another according to a selected rate and/or condition.

23. The apparatus according to claim 16, further comprising means which are capable of inserting the executable certificate into a first stream of data and means for processing, through encoding, a second stream of the data necessary for the satisfactory operation of the software application to be verified, prior to said second stream being obtained for processing through the software application to be verified.

24. The apparatus according to claim 15, wherein the processing means comprises means for determining a plurality of executable certificates which differ from one another according to a selected condition.

* * * * *